United States Patent
Koyanagi et al.

(10) Patent No.: US 7,525,281 B2
(45) Date of Patent: Apr. 28, 2009

(54) CHARGING SYSTEM FOR LEGGED WALKING ROBOT

(75) Inventors: Takuro Koyanagi, Wako (JP); Satoshi Kaneko, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 229 days.

(21) Appl. No.: 11/212,697

(22) Filed: Aug. 29, 2005

(65) Prior Publication Data

US 2006/0043930 A1 Mar. 2, 2006

(30) Foreign Application Priority Data

Sep. 1, 2004 (JP) .............................. 2004-253818

(51) Int. Cl.
*H02J 7/00* (2006.01)
(52) U.S. Cl. ...................................... 320/107; 320/115
(58) Field of Classification Search ................. 320/114, 320/107, 110, 112, 113, 115, 109, 128, 122, 320/121; 307/66
See application file for complete search history.

(56) References Cited

U.S. PATENT DOCUMENTS

| | | | | |
|---|---|---|---|---|
| 5,534,765 | A * | 7/1996 | Kreisinger et al. | ........... 320/106 |
| 6,030,229 | A * | 2/2000 | Tsutsui | .......................... 439/39 |
| 6,480,761 | B2 * | 11/2002 | Ueno et al. | .................. 700/245 |
| 6,764,373 | B1 | 7/2004 | Osawa et al. | |
| 2002/0006814 | A1 * | 1/2002 | Fukunishi | .................... 455/572 |
| 2002/0030412 | A1 * | 3/2002 | Lucas et al. | .................... 307/66 |

FOREIGN PATENT DOCUMENTS

| | | |
|---|---|---|
| EP | 1 043 824 A2 | 10/2000 |
| GB | 2 233 172 A | 1/1991 |
| GB | 2 313 721 A | 12/1997 |
| JP | 59-201115 A | 11/1984 |
| JP | 05-228885 | 9/1993 |
| JP | 2000-326271 | 11/2000 |

* cited by examiner

*Primary Examiner*—Akm E Ullah
*Assistant Examiner*—Nguyen Tran
(74) *Attorney, Agent, or Firm*—Squire, Sanders & Dempsey, LLP (57) ABSTRACT

An inexpensive charging system with a simple construction can supply charging current to a battery of a legged walking robot while maintaining the supply of required current to an electric load of the legged walking robot by an external power source. The charging system includes a connection circuit having a first, a second diode, a third diode, and a circuit that brings various negative electrode and a negative input terminal of the electric load into conduction, and an output electric power controller that sets an output voltage of the external power source to be higher than a total voltage of a voltage across electrodes of the battery when the battery is fully charged and a forward voltage of the third diode, while setting a current of the external power source that can be output to be larger than a required current of the electric load.

12 Claims, 6 Drawing Sheets

CHARGING SYSTEM FOR LEGGED WALKING ROBOT

BACKGROUND OF THE INVENTION

1. Field of the Invention

The present invention relates to a system for charging a battery provided in a legged walking robot by connecting an external power source to the legged walking robot.

2. Description of the Related Art

As a system for charging a battery provided in a robot, there has been known, for example, an industrial robot adapted to detect an absolute position of a movable part by an encoder, a backup battery being provided therein for uninterruptedly supplying current to the encoder so as to retain the data on the absolute position detected by the encoder even when the power line of the industrial robot is turned off (refer to, for example, Japanese Unexamined Patent Application Publication No. 5-228885).

There has been also known a mobile robot adapted to move among a plurality of work stations to carry out predetermined operations. While the mobile robot is halted at a work station, an external AC power source and the mobile robot are connected through the intermediary of the work station (refer to, for example, Japanese Unexamined Patent Application Publication No. 2000-326271). In this case, while the mobile robot is halted at a work station, a load of the mobile robot and a battery thereof are charged by the power supplied from the external AC power source, and power is fed from the battery to the load while the mobile robot is moving among work stations.

In the case of a legged walking robot using a battery as its power source, if the electric power supplied to joint motors of legs is cut off while charging the battery, then the action of each joint motor for retaining positions is lost, making it impossible to maintain a standing posture. Preferably, therefore, when charging the battery of the legged walking robot, the legged walking robot is connected to an external power source to supply charging current to the battery, and the current required to operate electric loads, such as joint motors, is also supplied from the external power source so as to enable the legged walking robot to continue its operation during the charging.

SUMMARY OF THE INVENTION

Accordingly, it is an object of the present invention to provide, with a simple construction and at low cost, a charging system capable of supplying charging current to a battery of a legged walking robot while maintaining the supply of required current to an electric load of the legged walking robot by an external power source connected to the legged walking robot.

To this end, according to the present invention, there is provided a charging system for charging a battery by connecting an external power source to a legged walking robot having the battery and an electric load connected to the battery, including a connection circuit that is provided in the legged walking robot and has a first diode that brings the positive electrode of the battery and the positive input terminal of the electric load into conduction, defining the direction from the positive electrode of the battery to the electric load as a forward direction, a second diode that brings the positive electrode of the external power source and the positive input terminal of the electric load into conduction, defining the direction from the positive electrode of the external power source to the positive input terminal of the electric load as a forward direction, a third diode that brings the positive electrode of the external power source and the positive electrode of the battery into conduction, defining the direction from the positive electrode of the external power source to the positive electrode of the battery as a forward direction, and a circuit that brings the negative electrode of the external power source, the negative electrode of the battery, and the negative input terminal of the electric load into conduction, and an output electric power controller that sets an output voltage of the external power source to be higher than a total voltage of a voltage across electrodes of the battery when the battery is fully charged and a forward voltage of the third diode, while setting a current of the external power source that can be output to be larger than a required current of the electric load.

With this arrangement, when the external power source is connected to the legged walking robot, load current is supplied to the electric load from the external power source through the intermediary of the second diode. In this case, the output power controller sets the open voltage of the external power source to be higher than the voltage across the electrodes when the battery is fully charged, so that the supply of current to the electric load from the battery is cut off by the first diode until the battery is fully charged.

Further, the output power controller sets the maximum output current of the external power source to be larger than the required current for the electric load. Hence, the difference between the maximum output current and the required current is supplied to the battery as charging current through the intermediary of the third diode, causing the voltage across the electrodes of the battery to gradually increase. When the battery reaches a fully charged level, the total voltage of the voltage across the electrodes of the battery and the forward voltage of the third diode becomes equal to the open voltage of the external power source. This stops the supply of the charging current to the battery from the external power source through the intermediary of the third diode.

Thus, according to the present invention, the simple, inexpensive construction, in which the legged walking robot is provided with the connection circuit to restrict an output current and an output voltage of the external power source by the output power controller, makes it possible to charge the battery to the fully charged level while supplying load current to an electric load from the external power source.

The charging system for a legged walking robot further includes a charging amount detector for detecting the charging amount of the battery, a current breaker switch for cutting off a current supply path from the positive electrode of the external power source to the positive electrode of the battery through the intermediary of the third diode, and a charging controller for cutting off the current supply path from the external power source to the battery through the intermediary of the third diode by the current breaker switch when the charging amount detector detects that the charging amount of the battery has reached a fully charged level after the legged walking robot and the external power source are connected to begin supply of current to the battery from the external power source through the intermediary of the third diode.

With this arrangement, when the battery has been charged to the fully charged level, the current supply path from the external power source to the battery is cut off by the current breaker switch so as to terminate only the charging of the battery, thus allowing the electric load to be operated by the current supplied from the external power source.

The connection circuit and the external power source are connected through the intermediary of a power receiving connector provided in the legged walking robot and a power feeding connector that is provided in the external power source and can be attached to and detached from the power receiving connector. The charging system of a legged walking robot further includes a current detector for detecting output current of the external power source, and a detaching controller for causing the legged walking robot to detach from the power feeding connector when the current detector detects that an output current of the external power source has decreased to a vicinity of a required current of the load after the operation of the current breaker switch is begun by the charging controller.

With this arrangement, the power receiving connector is detached from the power feeding connector after the supply of charging current to the battery from the external power source is cut off by the current breaker switch and the output current of the external power source decreases to the vicinity of the required current. This makes it possible to lower the level of an arc current that may be produced across the terminals of the power receiving connector and the terminals of the power feeding connector when they are detached, thus protecting the terminals from damage.

The legged walking robot is a biped walking robot, and the charging system further includes a posture retainer for holding the biped walking robot at a predetermined posture, and a connection detector for detecting whether the power receiving connector and the power feeding connector are in a connected state, wherein the power receiving connector and the power feeding connector are disposed at positions such that they are placed in the connected state when the biped walking robot is retained at the predetermined posture by the posture retainer, and the charging controller supplies current from the external power source to the connection circuit when the connection detector detects that the power receiving connector and the power feeding connector are in the connected state.

With this arrangement, when the biped walking robot is held at the predetermined posture by the posture retainer, the power receiving connector provided in the biped walking robot and the power feeding connector provided in the external power source are placed in the connected state. At this time, the biped walking robot is held at the predetermined position by the posture retainer, thus reducing the amount of electric power fed to a leg joint motor or the like included in the electric load that is required to retain the biped walking robot at the predetermined posture. Therefore, the reduction in the amount of electric power fed to the electric load makes it possible to increase the charging current to the battery to execute processing, such as checking of the functions of the biped walking robot, at the same time.

The predetermined posture is a seated posture, and the power receiving connector and the power feeding connector are placed in the connected state when the biped walking robot sits on the posture retainer and is held at the seated posture.

With this arrangement, when the biped walking robot is held at the seated posture to charge the battery, the amount of electric power to be fed to the electric load required to hold the biped walking robot at the seated posture can be reduced and the charging current to the battery can be increased.

The predetermined posture is a half-sitting posture, and the power receiving connector and the power feeding connector are placed in the connected state when the biped walking robot leans against the posture retainer and is retained at the half-sitting posture.

With this arrangement, when the biped walking robot is held at the half-sitting posture to charge the battery, the amount of electric power to be fed to the electric load required to hold the biped walking robot at the half-sitting posture can be reduced, so that the charging current to the battery can be increased.

The predetermined posture is a standing posture, and the power receiving connector and the power feeding connector are placed in the connected state when the biped walking robot leans against the posture retainer and is retained at the standing posture.

With this arrangement, when the biped walking robot is held at the standing posture to charge the battery, the amount of electric power to be fed to the electric load required to hold the biped walking robot at the standing posture can be reduced and the charging current to the battery can be increased.

DESCRIPTION OF THE PREFERRED EMBODIMENTS

Figure 1:
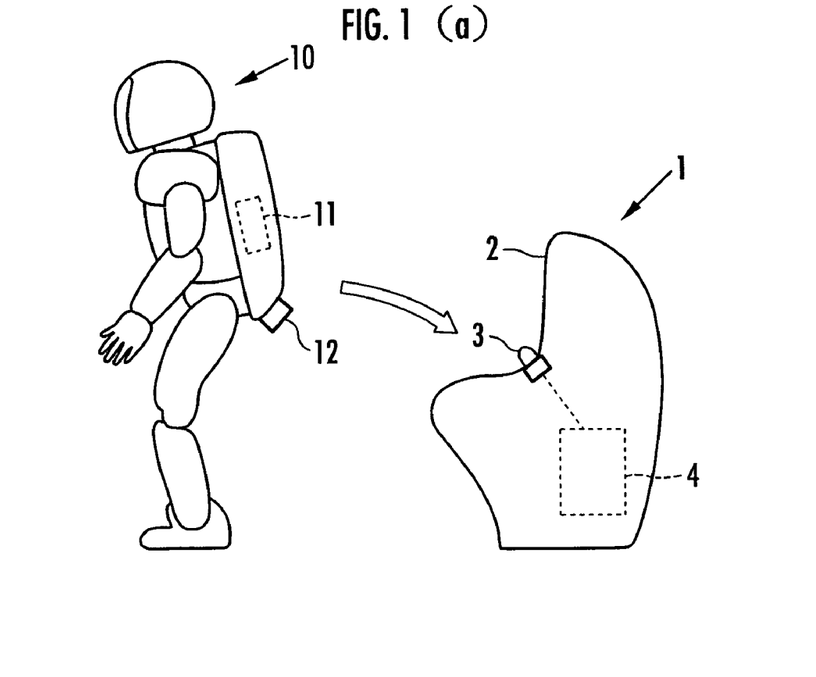
FIGS. 1A and 1B are explanatory diagrams showing how charging is performed by a charging system for a legged walking robot in accordance with the present invention.
Figure 2:
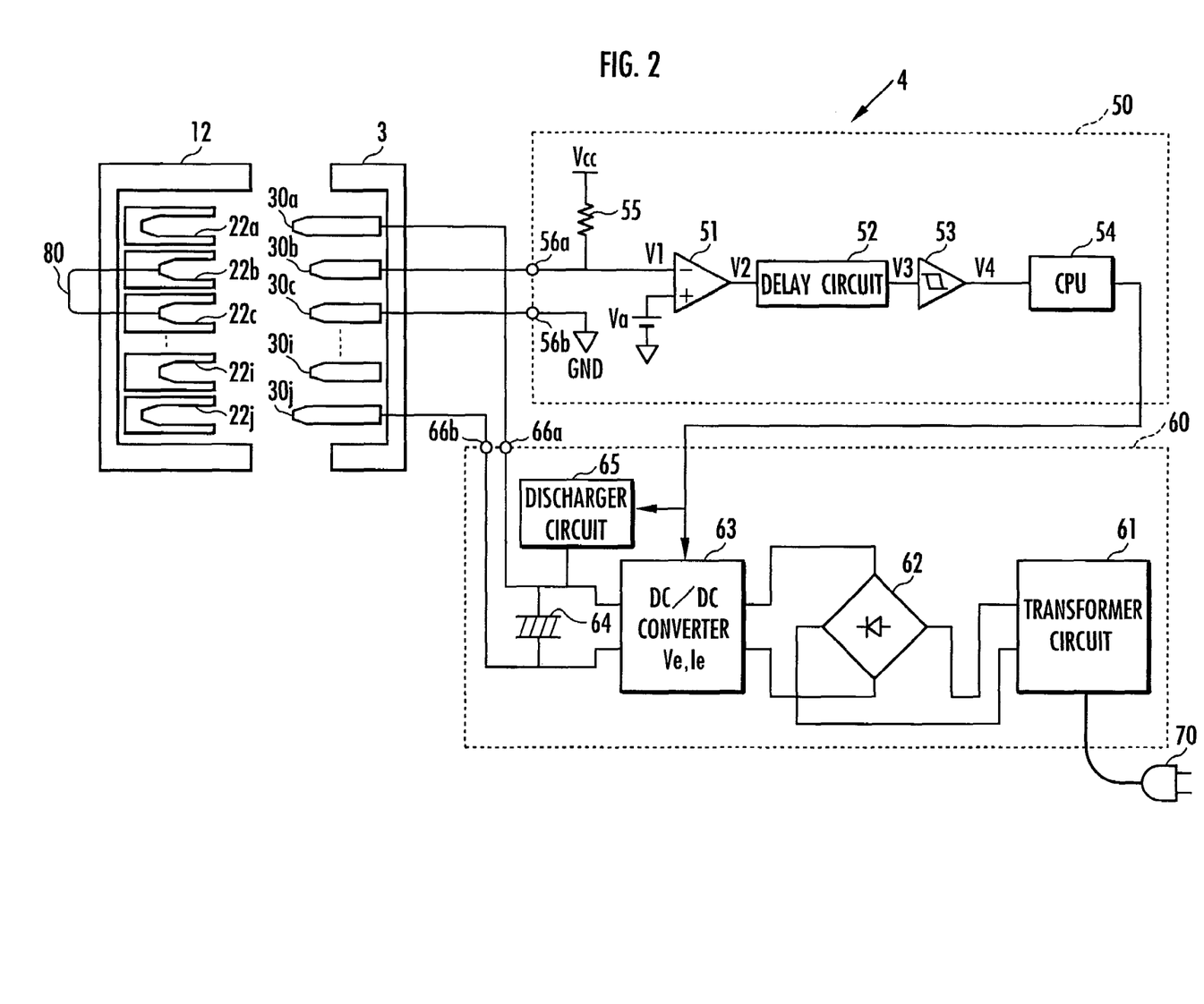
FIG. 2 shows the configurations of a power receiving connector provided in a biped walking robot, a power feeding connector, and a charging unit provided in a charger.
Figure 3:
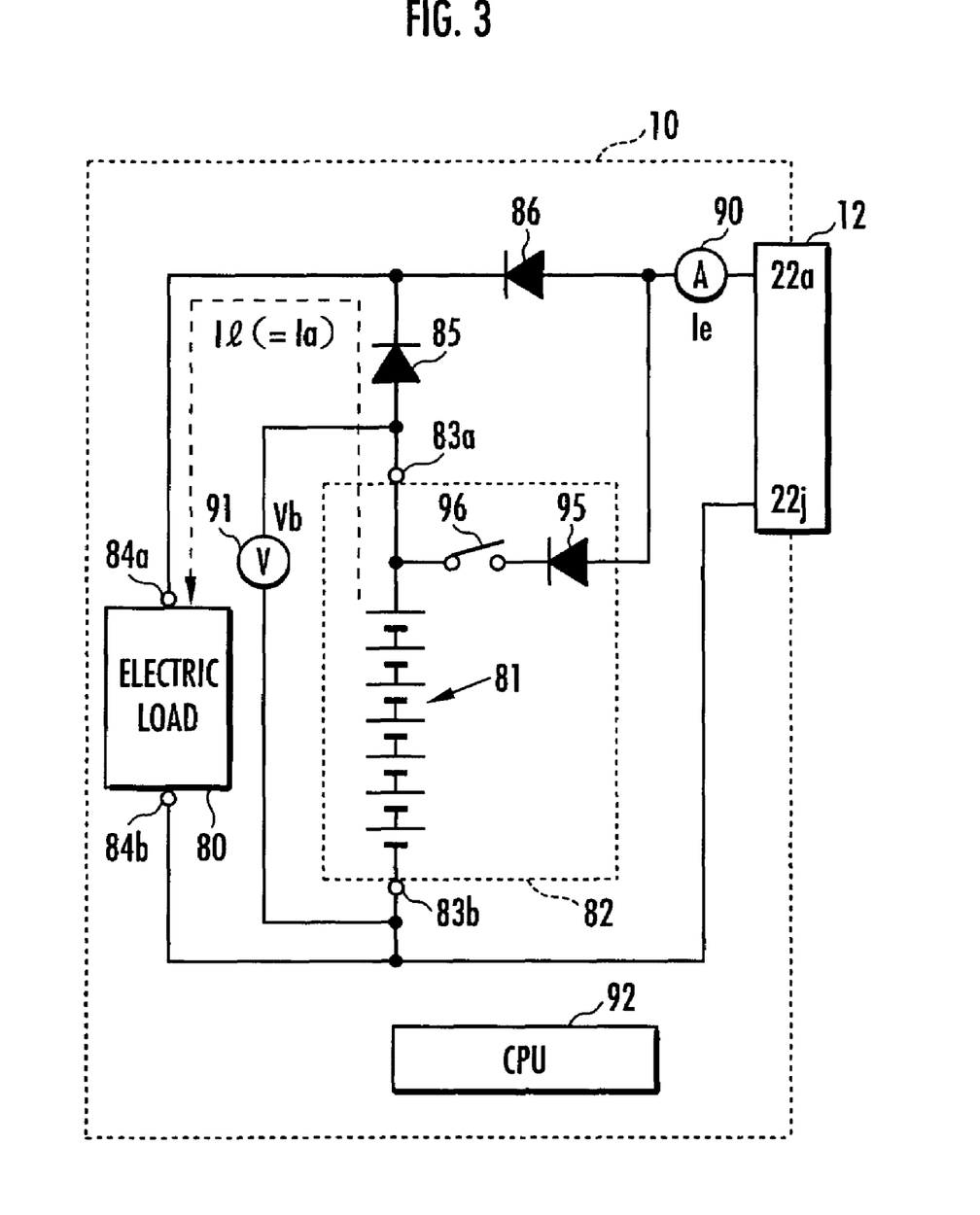
FIG. 3 is a configuration diagram of a battery provided in the biped walking robot and a connection circuit.
Figure 4:
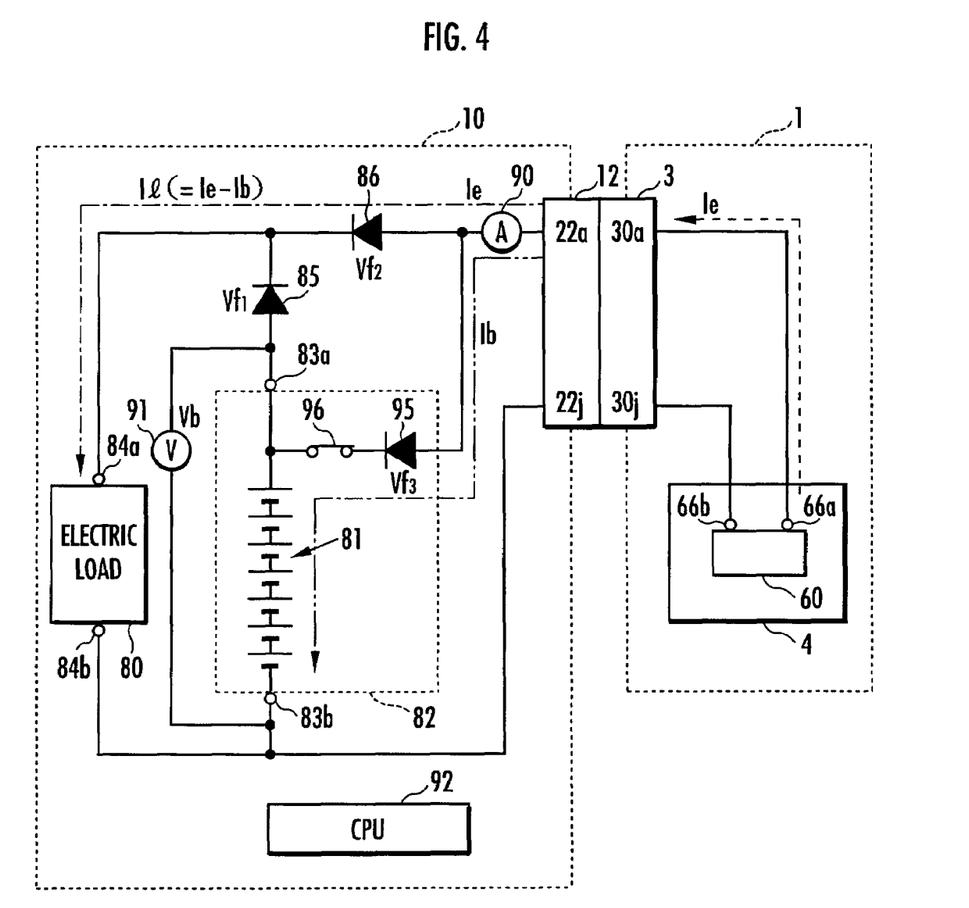
FIG. 4 is an explanatory diagram of a current path when the charger is connected to the biped walking robot.
Figure 5:
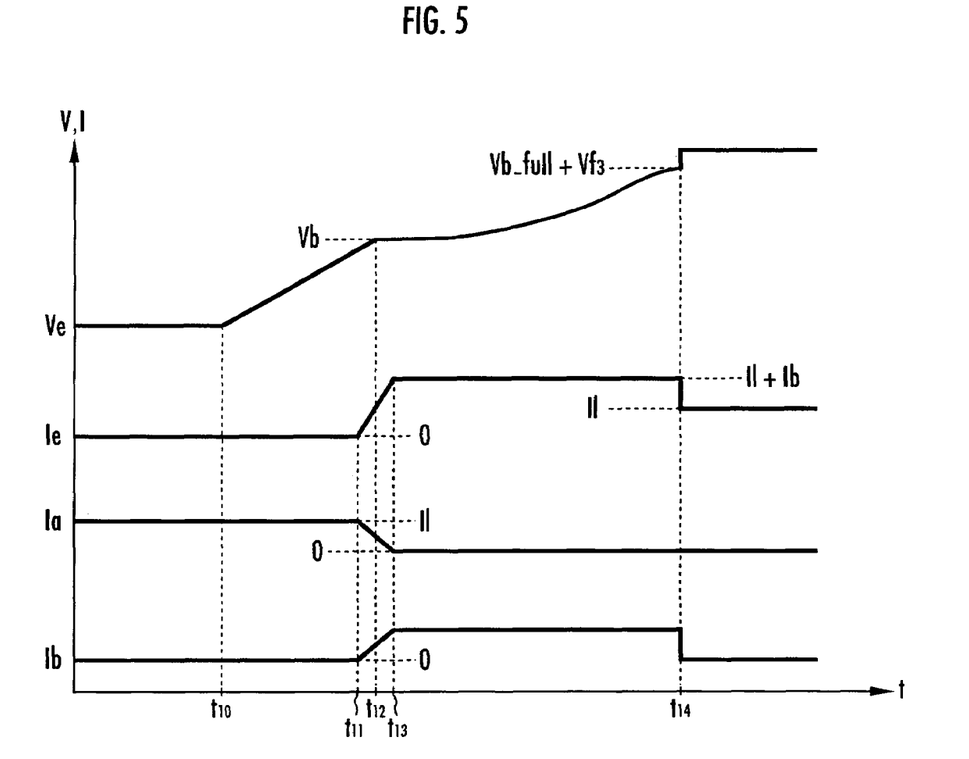
FIG. 5 is a timing chart when the battery is charged.
Figure 6:
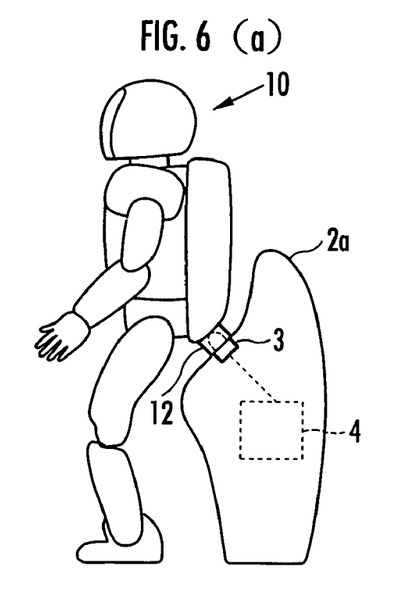
FIGS. 6A and 6B are diagrams showing how a biped walking robot and chargers are brought into contact to each other in other embodiments of the present invention.

An embodiment of the present invention will be explained with reference to FIG. 1 to FIG. 6. FIGS. 1A and 1B are explanatory diagrams showing how charging is performed by a charging system for a legged walking robot in accordance with the present invention, FIG. 2 shows the configurations of a power receiving connector provided in a biped walking robot, a power feeding connector, and a charging unit provided in a charger, FIG. 3 is a configuration diagram of a battery provided in the biped walking robot and a connection circuit, FIG. 4 is an explanatory diagram of a current path when the charger is connected to the biped walking robot, FIG. 5 is a timing chart when the battery is charged, and FIGS. 6A and 6B are diagrams showing how a biped walking robot and chargers are brought into contact to each other in other embodiments of the present invention.

Referring to FIG. 1A, the charging system for a biped walking robot, which is a legged walking robot, in accordance with the present invention, is adapted to charge a battery 11 provided in a biped walking robot 10 by a charger 1. The charger 1 is shaped like a chair, and has a seating and retaining unit 2 that holds the thighs and the back of the body of the biped walking robot 10 so as to maintain the biped walking robot 10 at a seated posture when the biped walking robot 10 sits down thereon, as shown in FIG. 1B. The charger 1 includes a power feeding connector 3 that fits to a power receiving connector 12 provided in the biped walking robot 10 and a charging unit 4 that supplies current to the biped walking robot 10 through the intermediary of the power feeding connector 3 and the power receiving connector 12.

Thus, charging the battery 11 by holding the biped walking robot 10 at the seated posture obviates the need for continuing power feed to a joint motor between a body 13 and a thigh 14, a joint motor between the thigh 14 and a crus 15, and a joint motor between the crus 15 and a foot 16 in order to maintain the posture. Hence, the battery 11 can be promptly charged while interrupting the power supplied to the above joint motors.

The biped walking robot 10 has a visual sensor (not shown) and recognizes the distance to the position of the charger 1 from imaging data obtained by the visual sensor when charging of the battery 11 has become necessary. Then, the biped walking robot 10 calculates the number of steps required to move to the position of the charger 1, and starts walking toward the charger 1. Thereafter, the biped walking robot 10 stops once immediately before the charger 1 and gives a half turn before it sits onto the seating and retaining unit 2.

Referring now to FIG. 2, the power receiving connector 12 provided in the biped walking robot 10 has ten terminals 22a to 22j, and the power feeding connector 3 provided in the charger 1 has ten terminals 30a to 30j matching the above terminals 22a to 22j. The charging terminals 30a and 30j of the power feeding connector 3 for supplying charging current are formed to be longer than signal terminals 30b to 30i for transmitting signals. Accordingly, the charging terminals 22a and 22j of the power receiving connector 12 into which the charging terminal 30a and 30j of the power feeding connector 3 are to be inserted are formed deeper than signal terminals 22b to 22i of the power receiving connector 12 into which the signal terminals 30b to 30i of the power feeding connector 3 are to be inserted.

Therefore, when fitting the power receiving connector 12 to the power feeding connector 3, the charging terminals 30a and 30j at both ends of the power feeding connector 3 are first inserted into the charging terminals 22a and 22j, respectively, at both ends of the power receiving connector 12, thus bringing them into conduction. After that, the signal terminals 30b to 30i of the power feeding connector 3 are inserted into the signal terminals 22b to 22i of the power receiving connector 12 so as to be brought into conduction.

Conversely, when the power receiving connector 12 is disengaged from the power feeding connector 3, the signal terminals 30b to 30i of the power feeding connector 3, which are short, are first detached from the signal terminals 22b to 22i, respectively, of the power receiving connector 12. Thereafter, the charging terminals 30a and 30j of the power feeding connector 3, which are long, are detached from the charging terminals 22a and 22j, respectively, of the power receiving connector 12.

The charging unit 4 provided in the charger 1 is equipped with a connection detector 50 connected by the signal terminals 30b and 30c of the power feeding connector 3 and connection terminals 56a and 56b to detect whether the power feeding connector 3 and the power receiving connector 12 are in the connected state (the connection detector 50 corresponding to the connection detector in the present invention), and a charging current generator 60 connected by the charging terminals 30a and 30j of the power feeding connector 3 and relay terminals 66a and 66b to generate charging current for the biped walking robot 10 (the charging current generator 60 corresponding to an external power source in the present invention).

The connection detector 50 includes a comparator 51 for comparing a voltage V1 of the signal terminal 30b of the power feeding connector 3 relative to GND with a threshold voltage Va, a delay circuit 52 for delaying a change in an output voltage V2 of the comparator 51, a Schmitt trigger circuit 53 for shaping an output voltage V3 of the delay circuit 52, and a CPU 54 that receives an output voltage V4 of the Schmitt trigger circuit 53 to determine whether the power feeding connector 3 and the power receiving connector 12 are in the connected state.

The comparator 51 outputs a high-level voltage Vh if the input voltage V1 applied to a negative input terminal is not more than the threshold voltage Va applied to a positive input terminal, and outputs a low-level voltage V1 if the input voltage V1 applied to the negative input terminal is higher than the threshold voltage Va applied to the positive input terminal. The threshold voltage Va is set at a level in the vicinity of a midpoint between the GND level and a Vcc level.

In the Schmitt trigger circuit 53, when an input voltage increases, if the input voltage V3 reaches a threshold value Vth or more in the increasing direction, then the output voltage V4 switches from V1 to Vh. Similarly, when the input voltage V3 decreases, if the input voltage V3 drops down to a threshold value Vt1 or less in the decreasing direction, then the output voltage V4 switches from Vh to V1. Incidentally, Vth and Vt1 are set at level in the vicinity a midpoint between V1 and Vh such that Vth>Vt1.

When the power receiving connector 12 and the power feeding connector 3 are in a detached state, Vcc (>Va) is applied to the negative input terminal of the comparator 51 through the intermediary of a pull-up resistor 55, causing the output voltage V2 of the comparator 51 to be V1. As a result, the output voltage V4 of the Schmitt trigger circuit 53 will be V1.

Conversely, when the power receiving connector 12 and the power feeding connector 3 are in the connected state, the signal terminals 30b and 30c of the power feeding connector 3 are brought into conduction by a short-circuiting line 80 that short-circuits the signal terminals 22b and 22c of the power receiving connector 12, and the input voltage V1 applied to the negative input terminal of the comparator 51 will be 0V (GND level). As a result, the output voltage V4 of the Schmitt trigger circuit 53 will be Vh.

This arrangement enables the CPU 54 to detect that the power receiving connector 12 and the power feeding connector 3 are in the connected state when the output voltage V4 of the Schmitt trigger circuit 53 is Vh, and to detect that the power receiving connector 12 and the power feeding connector 3 are in the detached state when the output voltage V4 of the Schmitt trigger circuit 53 is V1.

The charging current generator 60 includes a transformer circuit 61 that steps down AC power supplied through the intermediary of a plug 70, a rectifier circuit 62 that performs full-wave rectification of an AC voltage output from the transformer circuit 61, a DC/DC converter 63 that transforms a DC voltage output from the rectifier circuit 62, a capacitor 64 connected across output terminals of the DC/DC converter 63, and a discharger circuit 65 for discharging the charges from the capacitor 64.

An output current Ie and an output voltage Ve from the DC/DC converter 63 are restricted by control signals issued from the CPU 54. The configuration for restricting the output current Ie and the output voltage Ve of the charging current generator 60 by the CPU 54 and the DC/DC converter 63 corresponds to the output power controller in the present invention. The discharging operation of the discharger circuit 65 is also controlled by control signals issued from the CPU 54.

The CPU 54 starts output of power from the DC/DC converter 63 when it detects switching of the output voltage V4 of the Schmitt trigger circuit 53 from V1 to Vh, which indicates that the power receiving connector 12 and the power feeding connector 3 are in the connected state. Further, when the output voltage V4 of the Schmitt trigger circuit 53 switches from Vh to V1, the CPU 54 determines that the biped walking robot 10 has begun detaching the power receiving connector 12 from the power feeding connector 3, and discharges the charges from the capacitor 64 by the discharger circuit 65. This restrains spark discharge from occurring due to the charges of the capacitor 64 when the charging terminals 22a and 22j of the power receiving connector 12 are detached from the charging terminals 30a and 30j of the power feeding connector 3.

Referring now to FIG. 3, the biped walking robot 10 has an electric load 80, such as a motor, a battery unit 82 incorporating a battery 81 serving as the power source of the electric load 80, a first diode 85 that brings a positive electrode 83a of the battery 81 and a positive input terminal 84a of the electric load 80 into conduction, defining the direction from the positive electrode 83a to the positive input terminal 84a as the forward direction, and a second diode 86 that brings a charging terminal 22a of the power receiving connector 12 and a positive input terminal 84a of the electric load 80 into conduction, defining the direction from the charging terminal 22a to the positive input terminal 84a as the forward direction.

The biped walking robot 10 further includes a current sensor 90 (corresponding to the current detector in the present invention) for detecting current Ie supplied through the charging terminal 22a, a voltage sensor 91 (corresponding to the charging amount detector in the present invention) for detecting a voltage Vb across the terminals of the battery 81, and a CPU 92 for controlling the overall operation of the biped walking robot 10. Current detection signals of the current sensor 90 and voltage detection signals of the voltage sensor 91 are supplied to the CPU 92.

The battery unit 82 includes, in addition to the battery 81, a third diode 95 that brings the charging terminal 22a of the power receiving connector 12 and the positive electrode 83a of the battery 81 into conduction, defining the direction from the charging terminal 22a to the positive electrode 83a as the forward direction, and a current breaker switch 96 for interrupting connection between the charging terminal 22a of the power receiving connector 12 and the positive electrode 83a of the battery 81.

When the biped walking robot 10 is performing autonomous operation, being detached from the charger 1, discharge current Ia of the battery 81 is equal to load current I1 supplied to the electric load 80 (Ia=I1), as shown in FIG. 3.

FIG. 4 shows the power receiving connector 12 of the biped walking robot 10 connected to the power feeding connector 3 of the charger 1. In this case, the CPU 54 of the connection detector 50 (refer to FIG. 2) sets a maximum output voltage Ve_max of the charging current generator 60 at a voltage in the vicinity of the total voltage obtained by adding a forward voltage Vf of the third diode 95 to a voltage Vb_full between the electrodes 83a and 83b when the battery 81 is fully charged, and it sets a maximum output current Ie_max to be larger than a required current I1 of the electric load 80.

Hence, the current obtained by subtracting the required current I1 of the electric load 80 from Ie is supplied as a charging current Ib to the battery 81 until the voltage Vb across the electrodes of the battery 81 reaches Vb+Vf=Ve_max. The CPU 92 monitors the voltage Vb across the electrodes of the battery 81, which gradually increases as the charging proceeds, by voltage detection signals of the voltage sensor 91, and when the CPU 92 detects that Vb has increased to Ve_max-Vf, indicating that the battery 81 has been fully charged, it opens the current breaker switch 96 to terminate charging of the battery 81.

Further, after the current breaker switch 96 is started to open and after Ie detected on the basis of current detection signals of the current sensor 90 has decreased by the cut-off charging current Ib, the CPU 92 makes the biped walking robot 10 stand up and detach the power receiving connector 12 from the power feeding connector 3. In this case, the power receiving connector 12 and the power feeding connector 3 are detached after Ie supplied to the power receiving connector 12 from the power feeding connector 3 decreases, so that arc current that may be produced between the charging terminals 22a and 30a, and 22j and 30j can be reduced, permitting the charging terminals to be protected.

FIG. 5 is a timing chart that shows changes in the output voltage Ve and the output current Ie of the charging current generator 60, and the discharging current Ia and the charging current Ib of the battery 81 at the time of charging explained above. The axis of ordinates indicates the voltage Ve and the currents Ie, Ia and Ib, while the axis of abscissas indicates time t.

In the timing chart, $t_{10}$ denotes the point at which the power receiving connector 12 is connected to the power feeding connector 3, and the output voltage Ve of the charging current generator 60 gradually increases. However, no current is output from the charging current generator 60 (Ie=0) until $t_{11}$ at which Ve reduces by a forward voltage $Vf_1$ of the first diode 85 from the voltage Vb across the electrodes of the battery 81.

From $t_{11}$, the output current Ia of the battery 81 gradually reduces, while the output current Ie of the charging current generator 60 gradually increases until $t_{13}$ at which the output voltage Ve of the charging current generator 60 becomes higher than the voltage Vb across the electrodes of the battery 81 by the forward voltage $Vf_1$ of the third diode 95.

After $t_{13}$ at which the output voltage Ve of the charging current generator 60 reaches a level higher than the voltage $Vb+Vf_1$ across the electrodes of the battery 81, the supply of current from the battery 81 to the electric load 80 is cut off by the first diode 85 (Ia=0). Hence, the difference between the output current Ie of the charging current generator 60 and the load current I1 of the electric load (Ie-I1) is supplied as the charging current Ib to the battery 81.

Thus, as the battery 81 is charged, the voltage Vb across the electrodes of the battery 81 gradually increases, causing the output voltage Ve (=$Vb+Vf_3$) of the charging current generator 60 to gradually increase. Then, at $t_{14}$ when the voltage Ve across the electrodes of the battery 81 reaches a fully charged level Vb_full, the current breaker switch 96 is opened (Ib=0), finishing the charging of the battery 81.

In the present embodiment, the biped walking robot 10 has been seated on the charger 1 to supply charging current to the battery 11 of the biped walking robot 10 from the charging unit 4 of the charger 1; however, embodiments of the present invention are not limited thereto. The present invention can be applied to any other systems adapted to charge a battery of a legged walking robot by connecting an external power source to the legged walking robot.

In the first embodiment described above, the current breaker switch 96 for cutting off the charging path from the charger 1 to the battery 11 of the biped walking robot 10 has been provided to open the current breaker switch 96 upon completion of charging. The advantages of the present invention, however, can be obtained even if the current breaker switch 96 is not provided.

In the embodiment, the power receiving connector 12 is detached from the power feeding connector 3 after it is detected that a current detected by the current sensor 90 has reduced after the current breaker switch 96 is opened upon completion of the charging of the battery 11. However, the advantages of the present invention can be obtained even if such detection is omitted.

As in the second embodiment of the present invention shown in FIG. 6A, a charger 1a may be provided with a posture retainer 2a against which the biped walking robot 10 leans in a half-sitting posture, and the power receiving connector 12 of the biped walking robot 10 and the power feeding connector 3 of the charger 1a may be connected while the biped walking robot 10 is leaning against the posture retainer 2a in the half-sitting posture.

As in yet another embodiment of the present invention shown in FIG. 6B, a charger 1b may be provided with a posture retainer 2b against which the biped walking robot 10 leans in a standing posture, and the power receiving connector 12 of the biped walking robot 10 and the power feeding connector 3 of the charger 1a may be connected while the biped walking robot 10 is leaning against the posture retainer 2b in the standing posture.

In the aforesaid embodiments, the power receiving connector 12 has been provided on the back of the biped walking robot 10; however, the position of the power receiving connector is not limited thereto. Alternatively, the power receiving connector 12 may be installed at a different position, such as the sole of the a foot or a fingertip of a hand of the biped walking robot 10, and the power feeding connector 3 may be provided at a corresponding position on the charger.

What is claimed is:

1. A charging system for a legged walking robot for charging a battery by connecting an external power source to a legged walking robot having a battery and an electric load connected to the battery, comprising:

a connection circuit that is provided in the legged walking robot and has a first diode that brings the positive electrode of the battery and the positive input terminal of the electric load into conduction, defining the direction from the positive electrode of the battery to the electric load as a forward direction, a second diode that brings the positive electrode of the external power source and the positive input terminal of the electric load into conduction, defining the direction from the positive electrode of the external power source to the positive input terminal of the electric load as a forward direction, a third diode that brings the positive electrode of the external power source and the positive electrode of the battery into conduction, defining the direction from the positive electrode of the external power source to the positive electrode of the battery as a forward direction, and a circuit that brings the negative electrode of the external power source, the negative electrode of the battery, and the negative input terminal of the electric load into conduction; and output electric power control means comprising a voltage sensing means for sensing the voltage across electrodes of the battery, wherein the output voltage of the external power source is set so that a total voltage of the voltage sensed by the voltage sensing means and a forward voltage of the third diode is higher than the total voltage of the voltage across electrodes of the battery when the battery is fully charged and the forward voltage of the third diode, while setting a current of the external power source that can be output to be larger than a required current of the electric load, wherein the output electric power control means comprises a CPU that sets the voltage and the current of the external power source, wherein the electric load connected to the battery comprises a joint motor, wherein the legged walking robot comprises a power receiving connector, the external power source comprises a power feeding connector configured to be attached to and detached from the power receiving connector, and the power feeding connector is maintained at a connecting state with the power receiving connector when the legged walking robot is maintained at a predetermined posture by an output power of the joint motor, wherein the joint motor is maintained at a power supplied state when the legged walking robot is maintained at the predetermined posture during the charging of the battery, and wherein the connection circuit is connected to the external power source when the power receiving connector and the power feeding connector are connected.

2. The charging system for a legged walking robot according to claim 1, further comprising:

charging amount detecting means for detecting the charging amount of the battery;

a current breaker switch for cutting off a current supply path from the positive electrode of the external power source to the positive electrode of the battery through the intermediary of the third diode; and charging control means for cutting off the current supply path from the external power source to the battery through the intermediary of the third diode by the current breaker switch when the charging amount detecting means detects that the charging amount of the battery has reached a fully charged level after the legged walking robot and the external power source are connected to begin supply of current to the battery from the external power source through the intermediary of the third diode.

3. The charging system for a legged walking robot according to claim 2, further comprising:

current detecting means for detecting output current of the external power source; and detaching control means for causing the legged walking robot to detach from the power feeding connector when the current detecting means detects that an output current of the external power source has decreased to a vicinity of a required current of the load after the operation of the current breaker switch is begun by the charging control means.

4. The charging system for a legged walking robot according to claim 3, the legged walking robot being a biped walking robot, the charging system further comprising:

posture retaining means for holding the biped walking robot at a predetermined posture; and connection detecting means for detecting whether the power receiving connector and the power feeding connector are in a connected state, wherein the power receiving connector and the power feeding connector are disposed at positions such that they are placed in the connected state when the biped walking robot is retained at the predetermined posture by the posture retaining means, and the charging control means supplies current from the external power source to the connection circuit when the connection detecting means detects that the power receiving connector and the power feeding connector are in the connected state.

5. The charging system for a legged walking robot according to claim 4, wherein the predetermined posture is a seated posture, and the power receiving connector and the power feeding connector are placed in the connected state when the biped walking robot sits on the posture retaining means and is retained at the seated posture.

6. The charging system for a legged walking robot according to claim 4, wherein the predetermined posture is a half-sitting posture, and the power receiving connector and the power feeding connector are placed in the connected state when the biped walking robot leans against the posture retaining means and is retained at the half-sitting posture.

7. The charging system of a legged walking robot according to claim 4, wherein the predetermined posture is a standing posture, and the power receiving connector and the power feeding connector are placed in the connected state when the biped walking robot leans against the posture retaining means and is retained at the standing posture.

8. A charging system for a legged walking robot for charging a battery by connecting an external power source to a legged walking robot having a battery and an electric load connected to the battery, comprising:

a connection circuit that is provided in the legged walking robot and has a first diode that brings the positive electrode of the battery and the positive input terminal of the electric load into conduction, defining the direction from the positive electrode of the battery to the electric load as a forward direction, a second diode that brings the positive electrode of the external power source and the positive input terminal of the electric load into conduction, defining the direction from the positive electrode of the external power source to the positive input terminal of the electric load as a forward direction, a third diode that brings the positive electrode of the external power source and the positive electrode of the battery into conduction, defining the direction from the positive electrode of the external power source to the positive electrode of the battery as a forward direction, and a circuit that brings the negative electrode of the external power source, the negative electrode of the battery, and the negative input terminal of the electric load into conduction;

output electric power control means comprising a voltage sensing means for sensing the voltage across electrodes of the battery, wherein the output voltage of the external power source is set so that a total voltage of the voltage sensed by the voltage sensing means and a forward voltage of the third diode is higher than the total voltage of the voltage across electrodes of the battery when the battery is fully charged and the forward voltage of the third diode, while setting a current of the external power source that can be output to be larger than a required current of the electric load, wherein the output electric power control means comprises a CPU that sets the voltage and the current of the external power source;

charging amount detecting means for detecting the charging amount of the battery;

a current breaker switch for cutting off a current supply path from the positive electrode of the external power source to the positive electrode of the battery through the intermediary of the third diode;

charging control means for cutting off the current supply path from the external power source to the battery through the intermediary of the third diode by the current breaker switch when the charging amount detecting means detects that the charging amount of the battery has reached a fully charged level after the legged walking robot and the external power source are connected to begin supply of current to the battery from the external power source through the intermediary of the third diode;

current detecting means for detecting output current of the external power source; and detaching control means for causing the legged walking robot to detach from the power feeding connector when the current detecting means detects that an output current of the external power source has decreased to a vicinity of a required current of the load after the operation of the current breaker switch is begun by the charging control means, wherein the electric load connected to the battery comprises a joint motor, wherein the legged walking robot comprises a power receiving connector, the external power source comprises a power feeding connector configured to be attached to and detached from the power receiving connector, and the power feeding connector is maintained at a connecting state with the power receiving connector when the legged walking robot is maintained at a predetermined posture by an output power of the joint motor, wherein the joint motor is maintained at a power supplied state when the legged walking robot is maintained at the predetermined posture during the charging of the battery, and wherein the connection circuit that is connected to the external power source when the power receiving connector and the power feeding connector are connected.

9. The charging system for a legged walking robot according to claim 8, the legged walking robot being a biped walking robot, the charging system further comprising:

posture retaining means for holding the biped walking robot at a predetermined posture; and connection detecting means for detecting whether the power receiving connector and the power feeding connector are in a connected state, wherein the power receiving connector and the power feeding connector are disposed at positions such that they are placed in the connected state when the biped walking robot is retained at the predetermined posture by the posture retaining means, and the charging control means supplies current from the external power source to the connection circuit when the connection detecting means detects that the power receiving connector and the power feeding connector are in the connected state.

10. The charging system for a legged walking robot according to claim 9, wherein the predetermined posture is a seated posture, and the power receiving connector and the power feeding connector are placed in the connected state when the biped walking robot sits on the posture retaining means and is retained at the seated posture.

11. The charging system for a legged walking robot according to claim 9, wherein the predetermined posture is a half-sitting posture, and the power receiving connector and the power feeding connector are placed in the connected state when the biped walking robot leans against the posture retaining means and is retained at the half-sitting posture.

12. The charging system of a legged walking robot according to claim 9, wherein the predetermined posture is a standing posture, and the power receiving connector and the power feeding connector are placed in the connected state when the biped walking robot leans against the posture retaining means and is retained at the standing posture.

* * * * *